(12) United States Patent  (10) Patent No.: US 9,231,798 B2
Chiang et al.  (45) Date of Patent: Jan. 5, 2016

(54) CHANNEL SKEW IDENTIFICATION AND NOTIFICATION

(75) Inventors: Ting-Kuang Chiang, Saratoga, CA (US); Prasad Paranjape, Fremont, CA (US); Michael D. Jarchi, West Hills, CA (US); Mallikarjun Chillal, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/962,052

(22) Filed: Dec. 20, 2007

(65) Prior Publication Data

US 2009/0161247 A1  Jun. 25, 2009

(51) Int. Cl.
*G11B 5/00* (2006.01)
*H04L 25/14* (2006.01)

(52) U.S. Cl.
CPC ........................................ *H04L 25/14* (2013.01)

(58) Field of Classification Search
CPC . H04L 25/14; G02B 6/12007; G06F 13/4243; G06F 13/4256
USPC .................... 375/259, 260; 370/508
See application file for complete search history.

(56) References Cited

U.S. PATENT DOCUMENTS

| 6,618,395 | B1 | 9/2003 | Kimmitt |
| 7,406,616 | B2* | 7/2008 | Hendrickson et al. ........ 713/500 |
| 7,467,335 | B2* | 12/2008 | Otto et al. ..................... 714/700 |
| 2006/0092969 | A1 | 5/2006 | Susnow |
| 2007/0006053 | A1 | 1/2007 | Otto |
| 2008/0222594 | A1* | 9/2008 | Maniloff et al. ................ 716/16 |
| 2009/0074407 | A1* | 3/2009 | Hornbuckle et al. ........... 398/43 |

OTHER PUBLICATIONS

Koukourlis, "International Search Report," Nov. 2009, European Patent Office, Rijswijk, NL.
Koukourlis, "Written Opinion of the International Searching Authority," Nov. 2009, European Patent Office, Rijswijk, NL.

* cited by examiner

*Primary Examiner* — Khaled Kassim
*Assistant Examiner* — Zhaohui Yang
(74) *Attorney, Agent, or Firm* — David L. Soltz

(57) ABSTRACT

Embodiments of the present invention analyze a plurality of parallel channels and identify specific channel(s) that have skew outside of an acceptable skew error margin. In certain embodiments, this skew is identified by determining the timing misalignment between a channel under test and a deskew channel. Other channels within the plurality of channels are masked by transmitting a repeating masked bit pattern. This timing misalignment may be measured by comparing a segment within the channel under test to a corresponding segment within the deskew channel and identifying a time differential between the two segments.

17 Claims, 11 Drawing Sheets

CHANNEL SKEW IDENTIFICATION AND NOTIFICATION

BACKGROUND

A. Technical Field

This invention relates generally to skew identification and notification, and more particularly to the detection and notification of a skewed channel within a parallel connection in an electrical system.

B. Background of the Invention

Data traffic is oftentimes communicated on multiple parallel channels to a terminating node or component. This multi-channel communication may be implemented in a network system in which a signal is transported through a network on a multiple channels to a receiving node. Multi-channel communication may also be implemented within a node or within an integrated chip in the node. Certain components, such as demultiplexers and deserializers, within electrical circuitry are used to convert a serial stream of data into parallel data channels. In particular, these components separate or divide a serial signal onto multiple parallel channels that are output from the particular component. This demultiplexing and/or deserializing function within electrical circuitry provides a more effective method for communicating and processing high data rate signals within an electrical system, node or integrated circuit.

The maintenance of timing between these parallel channels is important in the operation of the circuitry. Proper operation of components within the path of the signal may rely on the timing of these channels falling within a certain skew error margin. In particular, certain components may require that the skew on each of the parallel channels fall below an acceptable threshold so that the signal may be properly processed, communicated or reconstructed.

Standards and protocols have been developed that relate to the maintenance of proper timing for these channels. For example, the SERDES Framer Interface Level 5 (hereinafter, "SFI-5") protocol specification was developed to create a standard of maintaining the timing across output channels on electrical components, such as a demultiplexer. This protocol defines a deskew channel that is output from a demultiplexer and is used to align each of the channels at a subsequent component. The protocol also includes a notification function if the skew on one or more of the parallel channels exceeds a skew error margin. In such an instance, an alarm is generated and provided to a user.

In accordance with the SFI-5 protocol, this alarm only notifies a user that skew across the channels is too large, but does not specifically identify the channel(s) that have the skew problem. At initial configuration or testing of an integrated test, an alarm may be generated that notifies the user that the skew on the demultiplexer channels is outside an acceptable skew error margin. This alarm may also be generated if skew drifts outside of this skew error margin during operation. In all of these instances, the channel or channels responsible for this skew error is not identified.

This lack of specificity of SFI-5 skew error alarms present certain difficulties in correcting a demultiplexer having too much skew. Because the particular channel(s) responsible for the skew alarm are not identified, a user is unable to perform skew compensation without having additional information not provided in this alarm. Skew compensation could be performed on the channel responsible for generating the alarm in order to bring the skew of demultiplexer channels within an acceptable error margin. This compensation may include performing pre-skew or post-skew operations such that latency is added on one or more channels to improve the alignment of the channels.

SUMMARY OF THE INVENTION

Embodiments of the present invention analyze a plurality of parallel channels and identify specific channel(s) that have skew outside of an acceptable skew error margin. In certain embodiments, this skew is identified by determining the timing misalignment between a channel under test and a deskew channel. This timing misalignment may be measured by comparing a segment within the channel under test to a corresponding segment within the deskew channel and identifying a time differential between the two segments.

A test pattern is transmitted on the channel under test having a sufficiently large width that allows for skew to be detected that is outside of a skew error margin. For example, the test pattern may be longer than the width of the skew error margin so that skew greater than this error margin may be identified on the channel under test.

During this testing procedure, the skew on the channels not being tested are masked from a skew analysis device that is performing the test. In various embodiments of the invention, these channels are masked by transmitting a repeated sequence of masked bit patterns on each of these masked channels. The width of the masked bit patterns is sufficiently small to prevent a skew being identified on these channels that is outside of the skew error margin. In certain embodiments, the width of the masked bit patterns is smaller than the width of the skew error margin.

The testing procedure comprises testing each channel within the plurality of channels and independently identifying the channels that have too much skew relative to the skew error margin. An alarm generator is provided that generates an alarm if the skew on one or more of the channels exceeds the skew error margin. In addition, this alarm also identifies the specific channels responsible for the alarm. This specific identification of the channels having too much skew allows for compensation of this skew to bring it within the skew error margin. For example, pre-skew buffering may be performed on one or more of the channels to reduce the amount of skew on the channel(s) responsible for the alarm.

Embodiments of the invention relate to the management of skew on electrical components that output a plurality of channels. Examples of these electrical components include, but are not limited to, demultiplexers, deserializers, encoders, error correction modules, and framers. Additionally, embodiments of the invention may relate to certain standards and protocol specifications that implement a deskew channel to re-align the timing of channels.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 is a general illustration of an SFI-5 compliant demultiplexer.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

As previously described, the SFI-5 specification provides a framework for maintaining timing across channels by aligning each channel to a deskew channel. For purposes of explanation, the present invention will be described in relation to the SFI-5 protocol and a compliant demultiplexer. However, one skilled in the art will recognize that the channel skew identification and notification features of the present invention may be applied to numerous types of electrical components and be relevant to various protocols or standards.

Figure 1:
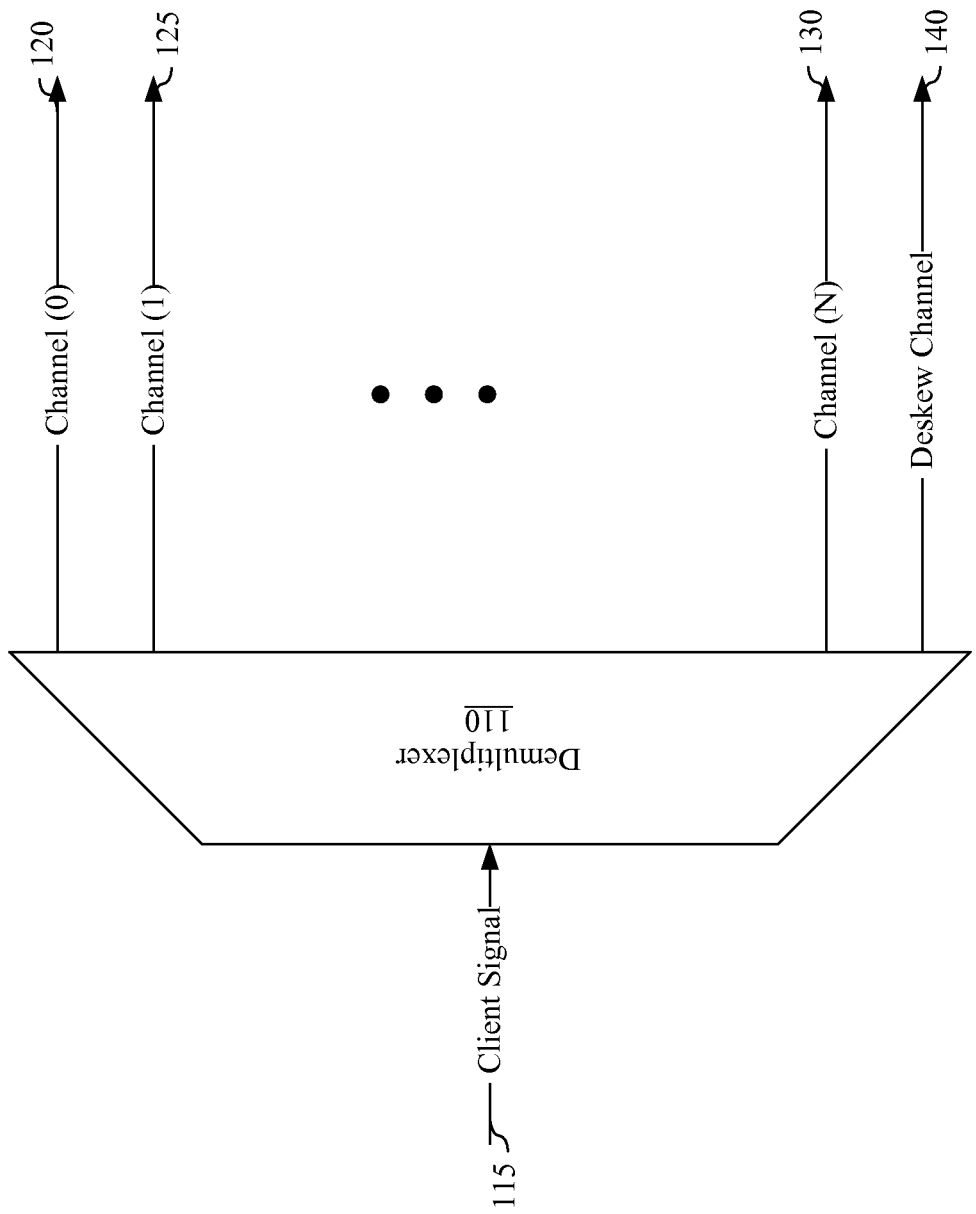

FIG. 1 illustrates an exemplary demultiplexer that is compliant with the SFI-5 specification. The demultiplexer 110 comprises an input 115 on which a signal, such as a client signal, is received and a plurality of output channels on which the signal is distributed. In this example, this plurality of output channels comprises a channel (0) 120, a channel (1) 125 through channel (N) 130. The demultiplexer 110 also includes a deskew channel 140 that is used to re-align the plurality of output channels after they have been received at a receiving electrical component. This receiving component may be devices such as a framer, an error correction device, an encoder, or other such devices within the relevant signal path.

In certain embodiments of the invention, the demultiplexer 110 receives a 40 gigabit client signal and separates it onto sixteen 2.5 gigabit output channels. Segments of each of these 16 output channels are combined to create the deskew channel that is transmitted from the demultiplexer 110. The width of these segments may be defined by a number of bits within the segment or a number of time slots.

As each of the channels propagates along the signal path, differential latencies between the channels may be generated. These differential latencies adversely affect the timing between the channels, define the skew across the channels, and present issues in processing, reconstructing or properly communicating the information along the signal path. These channels may propagate within the electrical domain, as shown in FIG. 1, or may be communicated within the optical domain.

As signal rates increase, the sensitivity to skew across these channels also increases because relatively more information is transmitted within a particular time period. Accordingly, the amount of skew on these channels at higher data rates should be more tightly managed.

Figure 2:
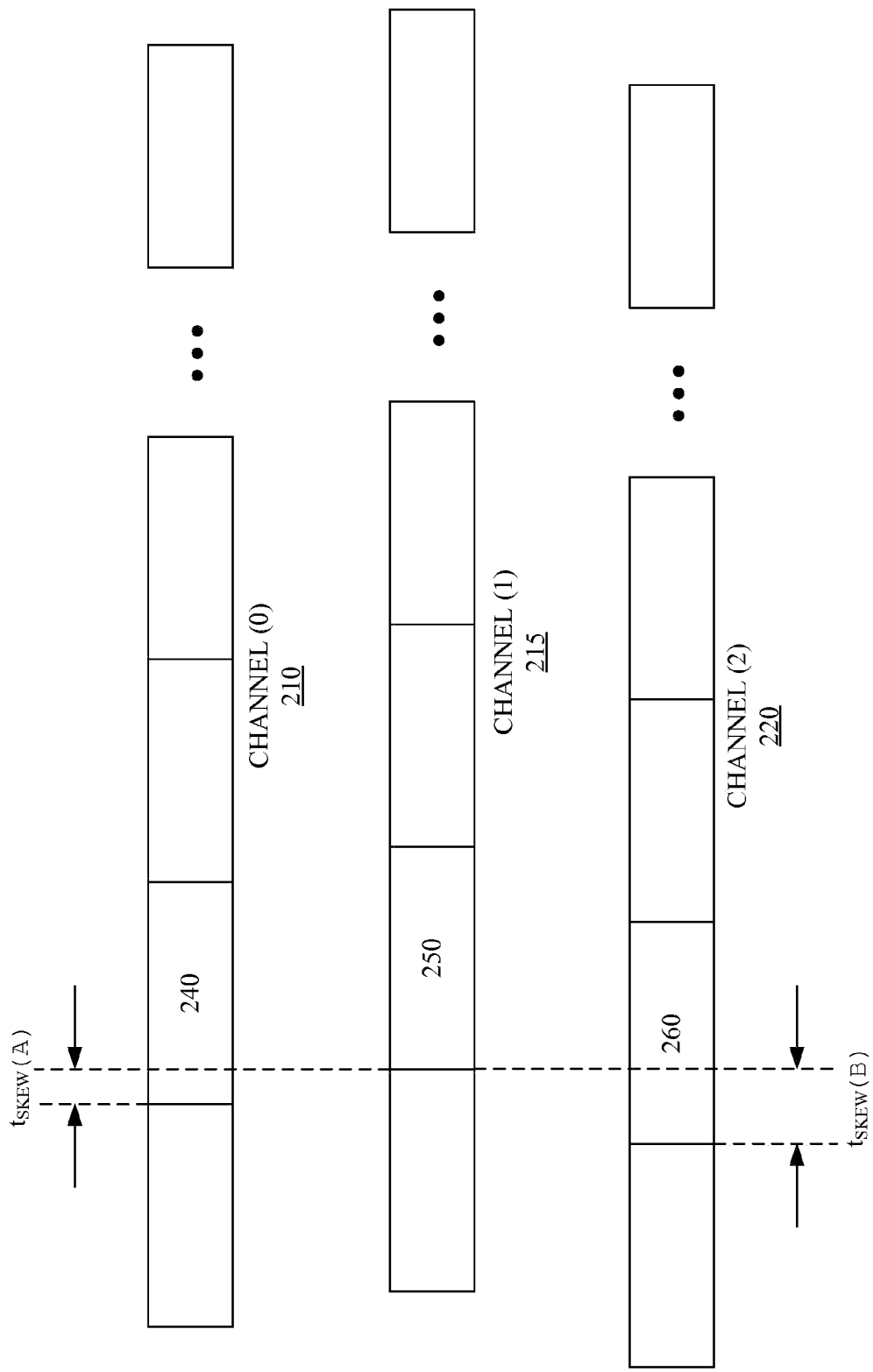
FIG. 2 is an diagram showing skew across different channels transmitted from an electrical component.

FIG. 2 illustrates exemplary skew across the plurality of output channels. In this example, the timing between channel (0) 210, channel (1) 215, and channel (2) 220 is shown in which each channel is misaligned relative to each other. Each channel is shown as being constructed of segments. The length of these segments, and their relationship between each other, is defined by the demultiplexing method used to generate these channels from the input signal to the demultiplexer.

A misalignment in the timing between channel (0) 210 and channel (1) 215 is shown as $t_{skew(A)}$. This misalignment may be measured as the time differential between the start points of corresponding segments between the two channels. For example, if the demultiplexer demultiplexed the input signal by sequentially dividing the signal on the output channels, then the segment 240 on channel (0) 210 and the segment 250 on channel (1) 215 would be contiguous segments within the input signal. The timing misalignment $t_{skew(A)}$ (i.e., skew) between the channels may create potential problems in the processing of the parallel channels and/or reconstruction of the serial signal from the parallel channels.

It is important to note that the skew across the channels may vary from channel to channel. As shown in FIG. 2, channel (1) 215 and channel (2) 220 have a timing misalignment $t_{skew(B)}$ as illustrated by the time differential between the segment 250 on channel (1) 215 and corresponding segment 260 on channel (2) 220. As previously discussed, this timing misalignment $t_{skew(B)}$ may adversely affect any processing of the channels or reconstruction of the signal. Furthermore, a comparison of the two previously discussed timing misalignments illustrates that $t_{skew(B)}$ is larger than $t_{skew(A)}$.

One skilled in the art will recognize that skew on certain channels may fall within an acceptable skew error margin and skew on other channels may be outside a skew error margin. For example, $t_{skew(A)}$ may be small enough to be within such a skew error margin, while $t_{skew(B)}$ may be too large and fall outside of this error margin. If a channel misalignment falls outside of a skew error margin, then the misaligned channel may not be able to be properly aligned because the skew is too large to correct.

The SFI-5 specification does not specifically define how to identify which specific channel or channels have too much skew; rather, an alarm is generated when at least one of the channel skews exceed this error margin. For example, a user may be notified that the output channels on a demultiplexer do not fully meet a particular skew error margin, but the user is not told which particular channel or channels are the cause of the alarm. This non-specificity of the channel(s) responsible for the skew alarm makes it difficult for an engineer to correct the skew across the channels. If the particular overly skewed channel is known, then pre-skew operations may be performed at the demultiplexer to bring the skew on this particular channel within the skew error margin.

Figure 3:
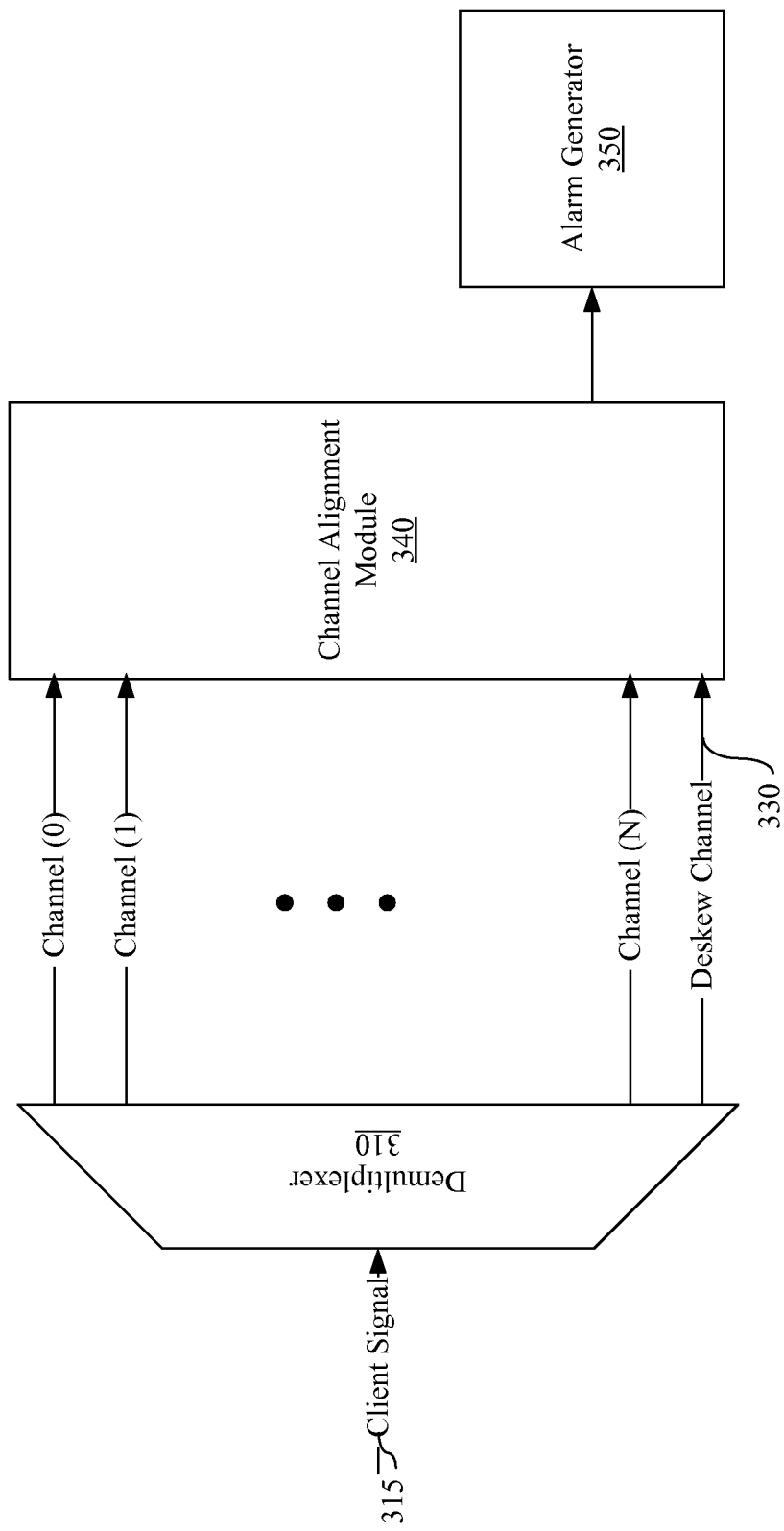
FIG. 3 illustrates a method in which a deskew channel is generated according to the SFI-5 specification.

FIG. 3 is an exemplary diagram of an SFI-5 compliant demultiplexer system. The demultiplexer 310 receives an input signal 315, such as a client signal, and divides the signal across a plurality of N channels. The demultiplexer 310 also generates a deskew channel 330 that is used to re-align the timing on each of the N channels. A channel alignment module 340 receives the N channels and the deskew channel 330 and re-aligns each of the N channels relative to the deskew channel 330, resulting in reducing or removing the skew across the N channels. In various embodiments of the invention, the channel alignment module 340 is integrated within an electrical component such as a framer chip or error correction component, such as a forward error correction module.

In many circumstances, the channel alignment module 340 requires that the timing misalignment between each of the N channels and the deskew channel 330 fall within a skew error margin. If there is a channel having too large of a timing misalignment, then the channel alignment module 340 may not be able to properly re-align the particular skewed channel. In such an instance, an alarm generator 350 generates an alarm that gives notification of a failure within the system. However, this alarm does not specifically identify the channel or channels that caused the failure; rather, the alarm is a general notification that there is at least one failure event in the re-alignment processes of the N channels.

Figure 4:
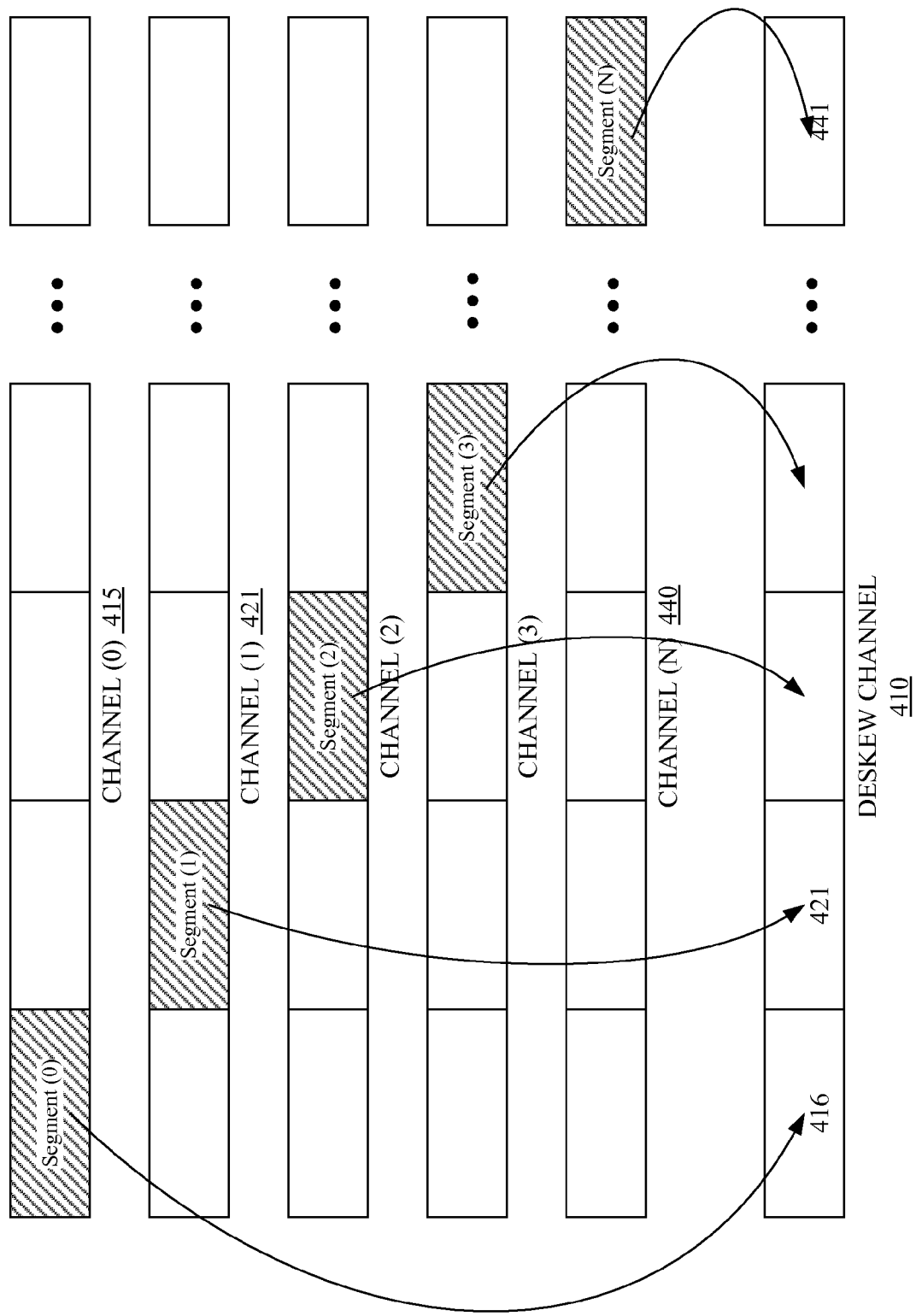
FIG. 4 generally illustrates a circuit in which parallel channels communicate a signal between electrical components.

The range of the skew error margin may depend on numerous factors, one of which is the method in which the deskew channel is generated and the buffering capabilities within the channel alignment module 340. FIG. 4 illustrates an exemplary deskew channel in accordance with the SFI-5 specification. The deskew channel 410 is constructed from segments from each of the N channels. The size of each of the segments may vary in bit width according to various factors including the sensitivity to skew of the system.

As shown in this Figure, segment (0) in channel (0) 415 is copied into a corresponding location 416 in the deskew channel 410. Segment (1) in channel (1) 420 is copied into a next location 421 in the deskew channel 410. This process is performed across the other channels until the segment (N) in channel (N) 440 is copied into location 441 in the deskew channel resulting in each channel having an alignment segment copied into the deskew channel 410.

As previously described, the deskew channel 410 is transmitted in parallel with the N channels to another electrical component, such as a framer. The deskew channel 410 is used to independently align each channel resulting in the removal of skew across the channels. However, in order for this alignment to occur, the amount of timing misalignment between a channel segment and its copied segment within the deskew channel 410 needs to be within the skew error margin.

Figure 5:
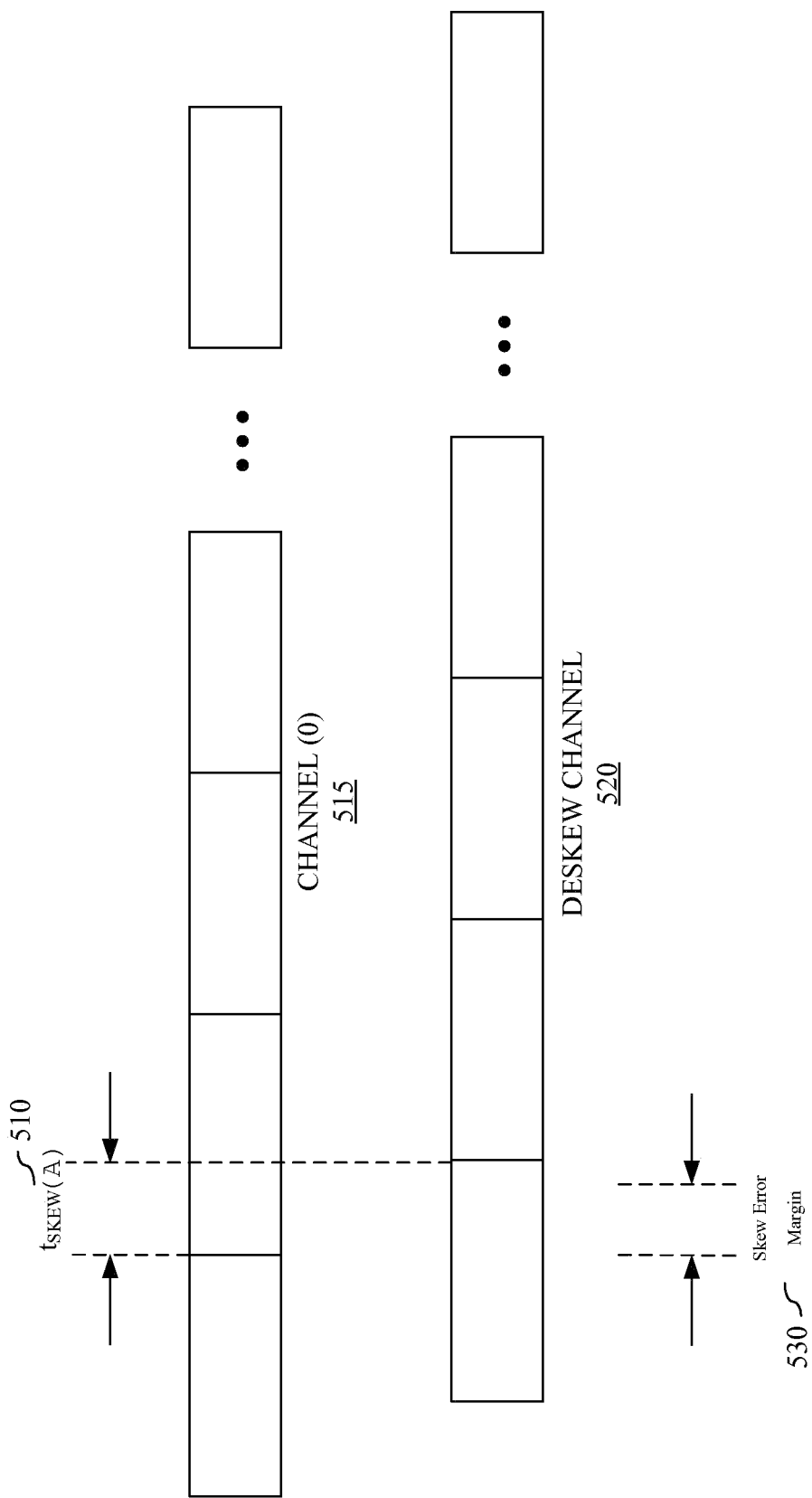
FIG. 5 illustrates a measurement of skew on a channel in relation to a skew error margin according to various embodiments of the invention.

FIG. 5 illustrates such an example of timing misalignment between a channel and a deskew channel being larger than an acceptable skew error margin. As shown, a timing misalignment, $t_{skew(A)}$ 510, is shown between channel (0) 515 and the deskew channel 520. The amount of misalignment on $t_{skew(A)}$ 510 is larger than a skew error margin 530 for the system. In such a scenario, the re-alignment of channel (0) 515 to the deskew channel 520 may not function properly because of the large amount of misalignment.

Many systems, including some that are compliant with the SFI-5 specification, only provide notification that such a misalignment problem is present, but does not specifically identify the channel(s) that fall outside of the skew error margin. If these channels are specifically notified, a designer may specifically address this problem by pre-skewing a certain channel or channels within the N channels to reduce this misalignment and bring it within the skew error margin. One skilled in the art will recognize that other processes may also be used to reduce the amount of misalignment so that the deskew channel can function properly.

According to various embodiments of the invention, a test mode is initiated and performed during which the skew on each channel is tested so that a specific malfunctioning channel may be identified. In certain embodiments, a channel under test is defined as the channel being tested for skew. During the testing of the channel under test, the skew on the other channels is effectively masked by transmitting repeating masked bit patterns on these other channels. If the misalignment on the channel under test is greater than the skew error margin, an alarm is generated and the user is able to identify the specific channel that generated the alarm.

Figure 6:
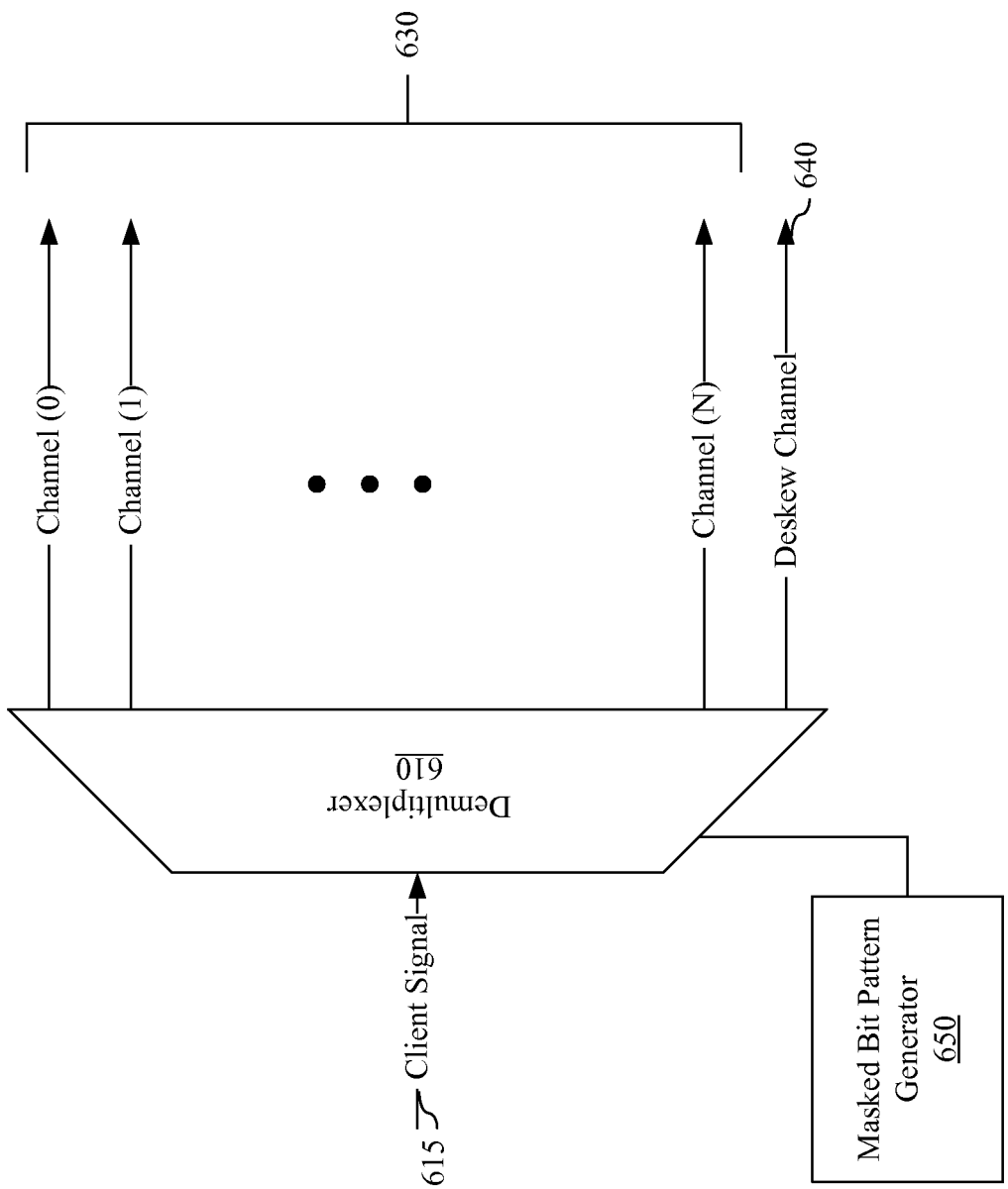
FIG. 6 illustrates a demultiplexing system according to various embodiments of the invention.

FIG. 6 illustrates a demultiplexer in accordance with various embodiments of the present invention. As shown, a demultiplexer 610 receives a signal 615, such as a client signal, and divides it onto N output channels 630. The demultiplexer 610 also outputs a deskew channel 640, such as one previously described, to re-align each of the N output channels 630.

A masked bit pattern generator 650 is coupled to, or coupled within, the demultiplexer 610. In certain embodiments of the invention, the masked bit pattern generator 650 is activated when the demultiplexer 610 is being tested. The masked bit pattern generator 650 creates a specific repeating bit pattern that is transmitted on the output channels expect for the channel under test. This repeating bit pattern masks these channels from the alarm generator so that any alarm generated relates only to the channel under test. The channel under test transmits a test pattern that has a width greater than the skew error margin so that the skew on the channel under test may be measured. This test pattern is defined as any bit sequence that allows an alarm to be generated if the skew on the channel under test falls outside of the skew error margin. For example, the test pattern may be a certain testing pattern used to test the channel or may be a data stream received from a network.

In certain embodiments of the invention, the masked bit pattern generator 650 is a standalone component. In various other embodiments, the masked bit pattern generator 650 is integrated within the demultiplexer 610. Furthermore, the testing procedure of the demultiplexer may be initiated using various methods including initiated by a user, automatically initiated at start-up and/or configuration, or automatically initiated after a detected failure on the channels.

Figure 7:
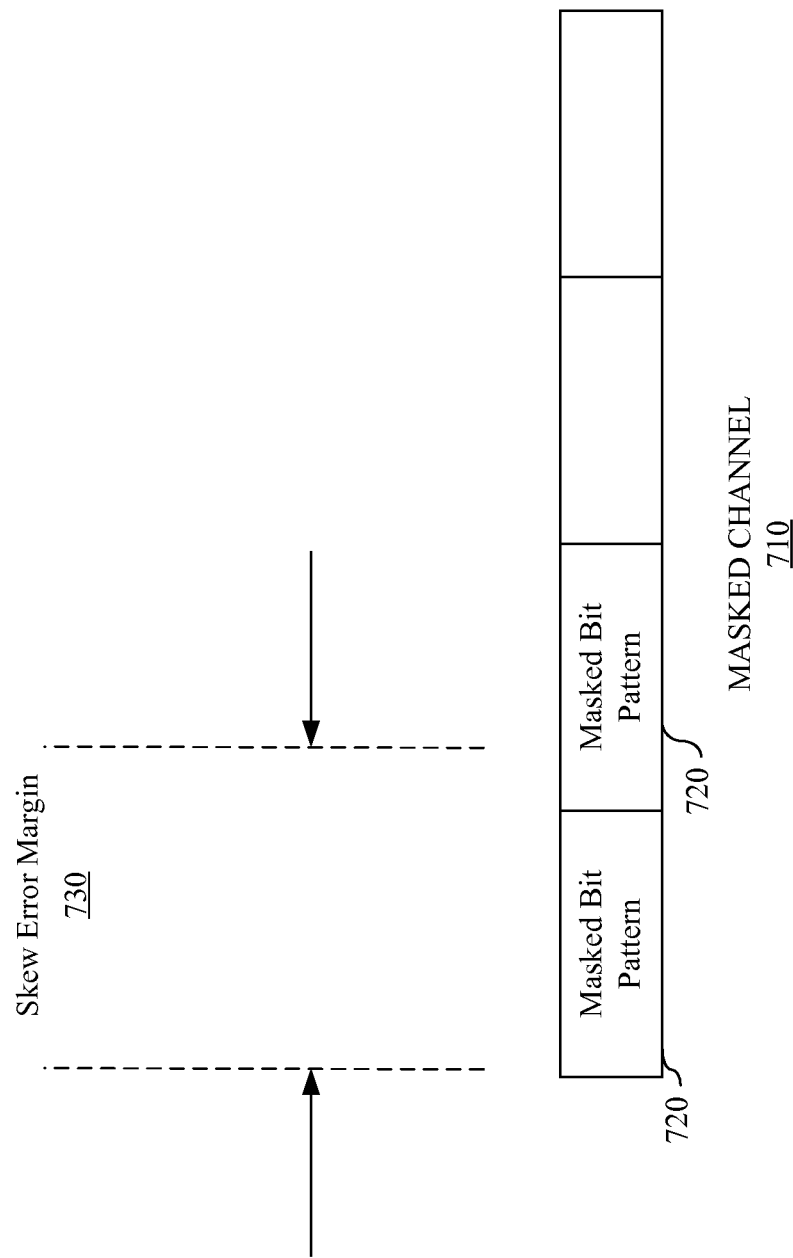
FIG. 7 is a diagram of a masked bit pattern size relative to the skew error margin according to various aspects of the invention.

FIG. 7 illustrates a repeating masked bit pattern relative to a skew error margin according to various embodiments of the invention. A masked channel 710 is shown having a repeating masked bit pattern 720 transmitted therein. Each masked bit pattern 720 has a width that is shorter than the skew error margin width 730. Because this pattern 720 is repeating, the skew on the masked channel 710 relative to the deskew channel can not exceed the skew error margin 730 and thus not generate an alarm.

In certain examples, a skew error margin 730 may be defined as five bit units such that a timing misalignment under five bits can be corrected. However, if the timing misalignment between a particular channel and the deskew channel is greater than five bits, then this error may not be able to be properly re-aligned. One skilled in the art will recognize that the size of the skew error margin can vary. Additionally, the width ratio between the masked bit pattern and the skew error margin may also vary depending on the system. For example, the masked bit pattern width may be defined such that multiple repeating masked bit patterns may fit within a single skew error margin.

Figure 8:
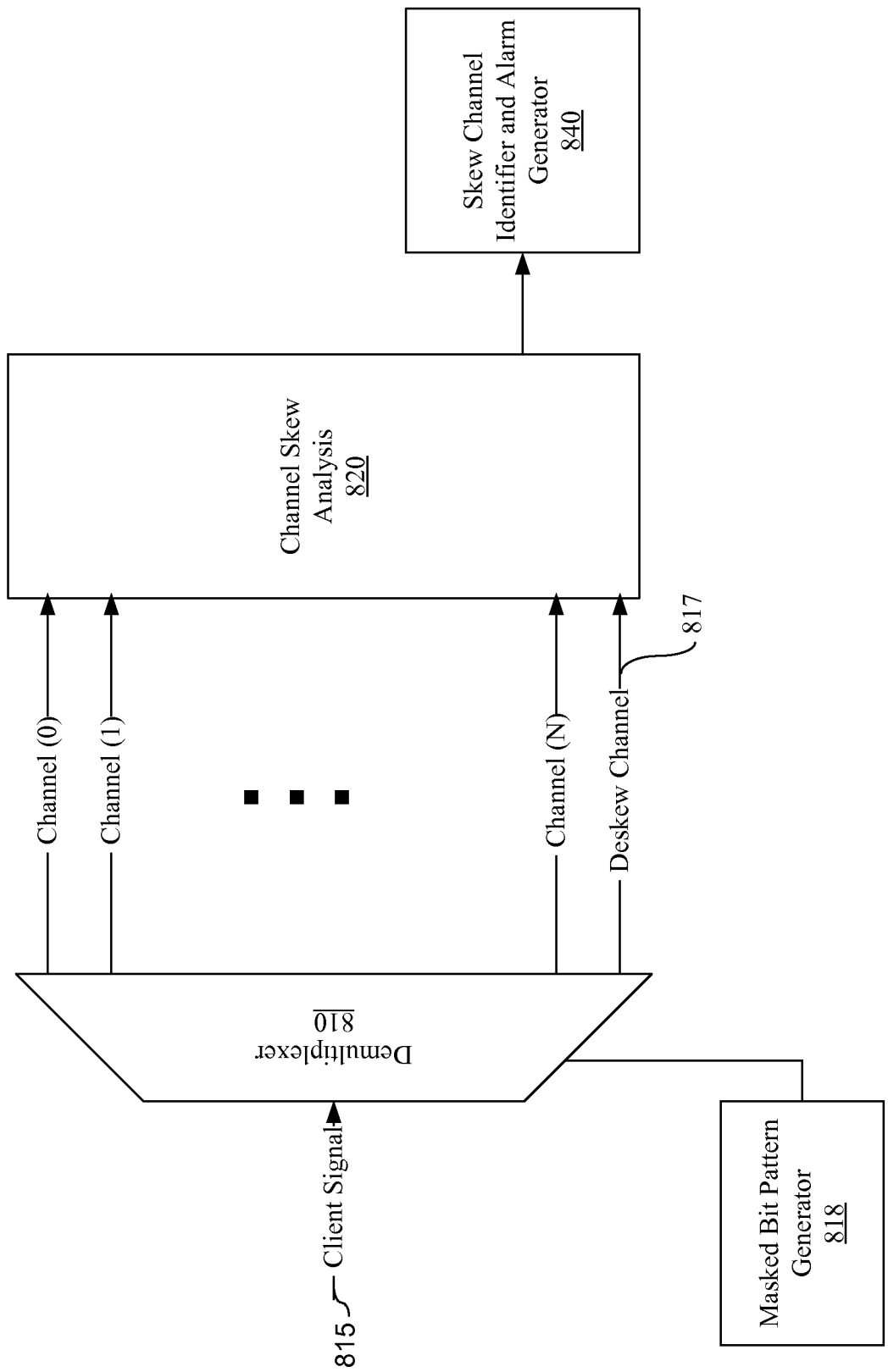
FIG. 8 is a channel skew detection and notification system in accordance with various embodiments of the invention.

FIG. 8 shows a system for identification and notification of skew channel error on a demultiplexer according to various embodiments of the invention. Although the system is described relative to a demultiplexer, one skilled in the art will recognize that the principles shown may be applied to numerous different types of circuitry, such as a deserializer; all of which are intended to be within the scope of the present invention.

A demultiplexer 810 receives an input signal 815 and separates it onto N output channels. The demultiplexer 810 also generates a deskew channel 817 that may be generated using various methods including those compliant with the SFI-5 specification. A masked bit pattern generator 818 is coupled to generate a masked bit pattern for each of the N channels except for the channel under test. As previously described, this masked bit pattern repeats on a channel and masks skew on the particular channel so that the channel under test, which transmits a test pattern, may be specifically analyzed.

A channel skew analysis module 820 receives the N output channels and the deskew channel 817, and analyzes each of the N channels relative to the deskew channel 817 using a processing device. This channel skew analysis module 820 may be integrated within a component on the signal path such as a framer chip or error correction circuitry (e.g., FEC module).

The channel skew analysis module 820 may be initiated in a testing mode of the demultiplexer 810. According to various embodiments, each channel within the N output channels is tested to identify whether its channel timing misalignment falls within a particular skew error margin. If one of the channels fails this test, a skewed channel identifier and alarm generator 840 generates an alarm that identifies the failed channel. As a result, skew compensation may be applied to the faulty channel such as pre-skewing the channel at the demultiplexer 810. The skewed channel identifier and alarm generator 840 may be integrated within the channel skew analysis module or a standalone component.

Figure 9:
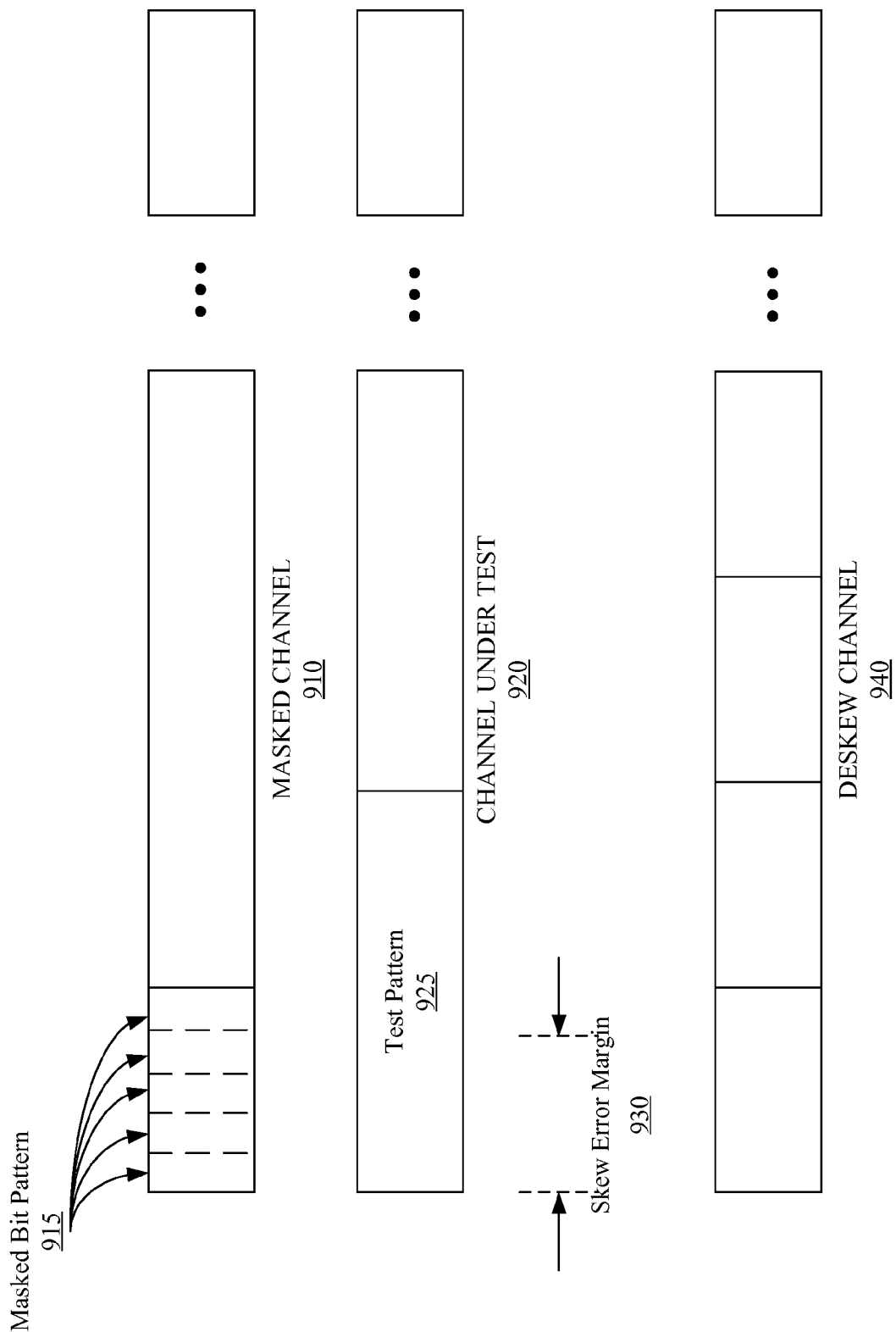
FIG. 9 is an illustration of a masked channel and a channel under test in accordance with various embodiments of the invention.

FIG. 9 is a general illustration of different channels relative to a skew error margin according to various embodiments of the invention. For illustrative purposes, a masked channel 910, channel under test 920, deskew channel 940 and a skew error margin 930 are shown.

The channel under test 920 is generated by providing a test pattern 925 on the channel. In certain embodiments, this test pattern 925 is repeated on the channel under test 920 and sufficiently wide so that a skew on this channel may be identified if larger than the skew error margin 930. In particular, the test pattern width is larger than the width of the skew error margin 930. The channel under test is communicated along a path and processed by the channel skew analysis 820. If the skew on the channel under test is above the skew error margin, then an alarm is generated and a user is able to specifically identify the channel under test as having a skew problem.

The masked channel 910 is generated by repeating masked bit patterns 915 that mask skew from being detected on the masked channel and prevents an alarm from being generated by the masked channel. The width of a masked bit pattern 915 is sufficiently small so that the channel skew analysis 820 is unable to detect whether the skew on the masked channel 910 is above the skew error margin 930. In certain embodiments, the width of each of the masked bit pattern 915 is smaller than the width of the skew error margin 930. For example, as shown in FIG. 9, the width of a masked bit pattern 915 is approximately 25% of the width of the skew error margin 930. One skilled in the art will recognize that various width sizes of the masked bit pattern may be used.

The deskew channel 940 is shown in which each segment length therein is approximately 500% wider than the masked bit pattern 915 and approximately 50% shorter than the test pattern 925. When the skew analysis module 820 analyzes the masked channel 910, it will not be able to detect skew being larger than the skew margin error 930, but will be able to identify skew on the channel under test 920 that is larger than the skew margin error 930. As a result, a testing procedure on a plurality of output channels will not only be able to determine that skew on one of the channels is too large, but also be able to specifically identify the channel or channels having the skew problem.

Figure 10:
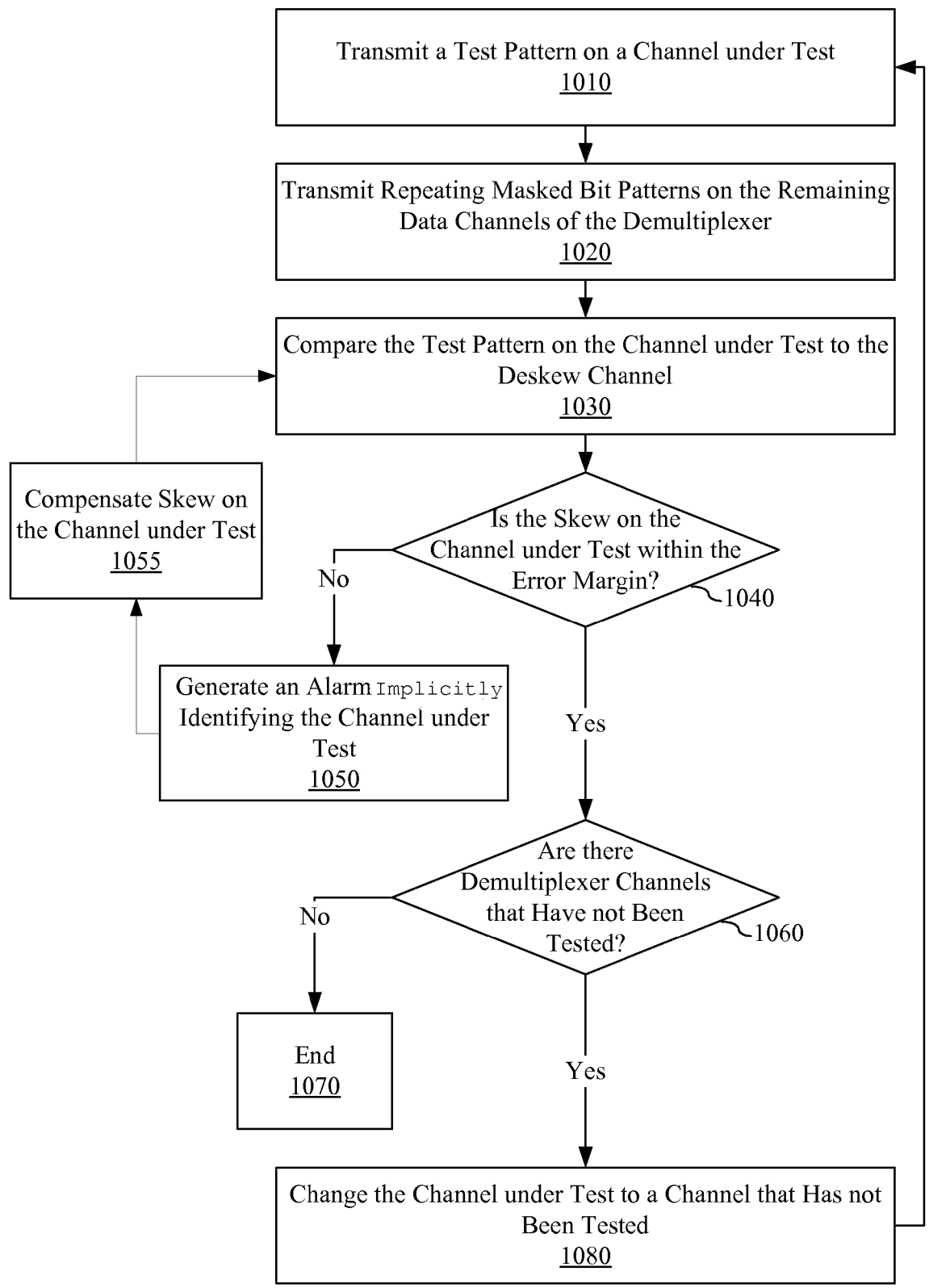
FIG. 10 is a flowchart illustrating a method of channel skew management and user notification in accordance with various embodiments of the invention.

FIG. 10 is a flowchart illustrating a method, independent of structure, that identifies a channel(s) within a plurality of parallel channel that has skew outside a skew error margin according to various embodiments of the present invention. A test pattern that is longer than a skew error margin is transmitted 1010 on a channel under test. A repeating mask bit pattern is transmitted 1020 on the remaining channels. A deskew channel is also transmitted that is used to re-align the channels.

The skew of the channel under test is identified by comparing 1030 the channel under test to the deskew channel to identify the timing misalignment between the two channels. An analysis is performed to identify 1040 whether the skew on the channel under test is within a skew error margin. If this skew is outside of the skew error margin, then an alarm is generated 1050 that implicitly identifies the specific channel having a skew problem. In various embodiments of the invention, skew compensation is performed 1055 on the specific channel under test having a skew problem. For example, the specific channel may be pre-skewed to bring the skew on the channel back within the skew error margin. The channel under test may then be re-tested by returning to step 1030 and testing it with the new compensation.

If the skew is below the skew error margin, then a determination is made as to whether there are any other channels that have not been tested 1060.

If all of the channels have been tested, then the method ends 1070. If there are channel that have not been tested, then one of the remaining untested channels is designated 1080 as a channel under test and the procedure is performed on this new channel under test.

Figure 11:
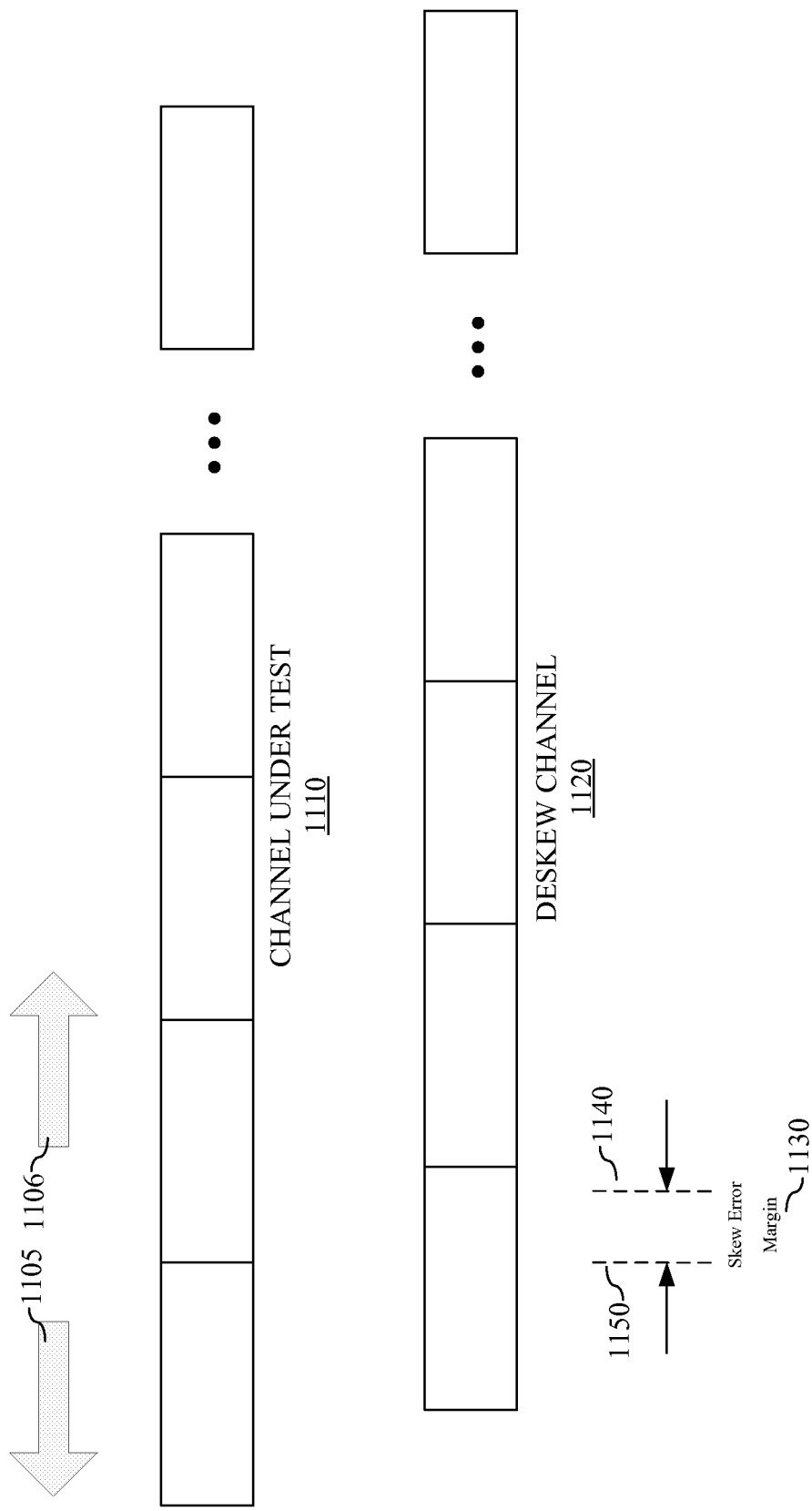
FIG. 11 is a diagram showing channel alignment to a skew error margin according to various embodiments of the invention.

FIG. 11 illustrates a method in which channel alignment may be performed on each of the channels under test according to various embodiments of the invention. This channel alignment method realigns the channel skew relative to the skew error margin 1130 in order to improve the channel's tolerance to skew error generation (i.e., the channel skew falling outside of the skew error margin).

This channel alignment identifies each boundary of the skew error margin corresponding to each channel under test and adjusts the channel under test to improve its skew tolerance. In certain embodiments of the invention, the channel under test 1110 is shifted in time in a first direction 1105 relative to the deskew channel 1120 so that the alarm generator 350 generates an alarm. The first location of the channel under test 1110 that initially generated the alarm corresponds to a first boundary 1150 of the skew error margin 1130. The channel under test 1110 is also shifted in time in a second 1106 direction relative to the deskew channel 1120 so that the alarm generator 350 generates another alarm. This second location of the channel under test 1110 that initially generated the alarm corresponds to a second boundary 1140 of the skew error margin 1130. As a result, the skew error margin boundaries 1140, 1150 are specifically identified for the particular channel under test.

In order to improve skew tolerance, the location of the channel under test 1110 is adjusted to improve its distance from each of the boundaries 1140, 1150. In certain embodiments, this adjustment moves the location of the channel under test 1110 so that the channel skew fall at or near the center of the skew error margin 1130. As a result, as the skew on a channel drifts, it is less likely to generate a skew alarm because of its improved initial location relative to the two boundaries 1140, 1150. This channel alignment may be performed intermittently during the life of the relevant electrical components, and/or at initial configuration of these components.

Although embodiments of the present invention have been illustrated and described in relation to a demultiplexer, one skilled in the art will recognize that the invention is not limited to such a demultiplexer. Rather, the invention may be applied to any electrical component that outputs a plurality of electrical channels on which skew is relevant. Examples of such electrical components include, but are not limited to, a demultiplexer, a deserializer, an error correction device, a framer, and an encoder.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

We claim:

1. A method comprising:
operating a demultiplexer in a first mode and a second mode, the demultiplexer having a plurality of outputs;
in the first mode, the demultiplexer receives a client signal and supplies each of plurality of portions of the client signal at a respective one of the plurality of outputs, and
in the second mode:
the demultiplexer transmits a first bit sequence on a first channel supplied from a first one of the plurality of outputs of the demultiplexer, within a plurality of channels, the first bit sequence having a first width, which is greater than a width of a skew error margin,
the demultiplexer transmits each of a plurality of data streams on a corresponding one of a group of channels, within the plurality of channels, each of the plurality of data streams including a repeating second bit sequence, the second bit sequence having a second width, which is less than the width of the skew error margin, each of the plurality of data streams being output from a corresponding one of remaining ones of the plurality of outputs of the demultiplexer, the repeating second bit sequence being input to the demultiplexer, and
the demultiplexer transmits successive bit segments on a second channel, within the plurality of channels, each of the bit segments is a copy of a portion of a respective one of the plurality data streams, such that one of the bit segments includes a portion of the first bit sequence, each said copy of the portion of the respective one of the plurality of data streams having a third width, which is greater than the skew error margin;
measuring a skew value between the first bit sequence and said one of the bit segments; and
generating an alarm if the skew value is greater than the skew error margin, the alarm including an identifier that identifies the first channel.

2. The method of claim 1, the method further comprising:
measuring a difference in a time of arrival of the first bit sequence and said one of the bit segments at a receiver node.

3. The method of claim 2 wherein said one of the bit segments is a first of the bit segments, a second of the bit segments including a bit segement of the second channel, the method further comprising transmitting the second of the bit segments on the second channel.

4. The method of claim 1 wherein the second channel is a deskew channel and the method further comprising generating the second channel in accordance with an SFI-5 specification.

5. The method of claim 1 further comprising the step of compensating for the measured skew value.

6. The method of claim 5 further comprising a pre-skew procedure performed on at least one channel, within the plurality of channels, to bring the measured skew value within the skew error margin.

7. A method of claim 1, wherein the first width equals the third width.

8. A system comprising:
a demultiplexer that operates in a first mode and a second mode, the demultiplexer has a plurality of outputs,
in the first mode, the demultiplexer receives a client signal and supplies each of plurality of portions of the client signal at a respective one of the plurality of outputs, and
in the second mode:
the demultiplexer outputs each of a plurality of channels on a respective one of the plurality of outputs and a reference channel;
a test pattern generator, that transmits a first bit sequence on a first channel on a first output of the demultiplexer during the second mode, the first bit sequence having a first width greater than a width of a skew error margin;
a masked bit pattern generator providing repeating second bit sequences to an input of the demultiplexer during the second mode, such that each of a plurality of second outputs of the demultiplexer supplies a corresponding one of a plurality of data streams on a group of channels within the plurality of channels, each of which including said repeating second bit sequences, each of said repeating bit sequences having a second width less than the skew error margin, each of the group of channels being supplied by a respective one of remaining ones of the plurality of outputs of the demultiplexer;
a channel skew analysis module, coupled to receive the first channel and the reference channel, that measures skew between the first channel and the reference channel, the reference channel including successive bit segments, each of which being a copy of a portion of a corresponding one of the plurality of data streams, such that one of the bit segments includes a portion of the first bit sequence, each said copy of the portion of the corresponding one of the plurality of data streams having a third width, which is greater than the skew error margin; and an alarm generator, coupled to the channel skew analysis module, the alarm generator configured to generate an alarm if the measured skew is outside of the skew error margin, the alarm including an identifier that identifies the first channel.

9. The system of claim 8 wherein the electrical component is a first electrical component, the system further comprising a second electrical component, such that the channel skew analysis module, and the alarm generator are integrated within the second electrical component being selected from a group consisting of a framer, an error correction device, a processor, and an encoder.

10. The system of claim 8 wherein the first bit sequence includes a first plurality of bits and the second bit sequence includes a second plurality of bits, and the reference channel carries the first and second pluralities of bits.

11. The system of claim 8 wherein the reference channel is a deskew channel.

12. The system of claim 11 wherein the deskew channel is generated in accordance with an SFI-5 specification.

13. The system of claim 8 further comprising a pre-skew buffer that compensates for the measured skew.

14. A channel skew analysis device, comprising:
a demultiplexer that has a plurality of outputs, the demultiplexer being operable in a first mode and a second mode;
in the first mode, the demultiplexer receives a client signal and supplies each of plurality of portions of the client signal at a respective one of the plurality of outputs, and
in the second mode:
a first one of the plurality of outputs of the demultiplexer supplies a first channel, within a plurality of channels, the first channel having a first bit sequence, the first bit sequence having a width greater than a width of a skew error margin;
a bit generator circuit that supplies a repeating second bit sequence to an input of the demultiplexer;
in the second mode, second ones of the plurality of outputs of the demultiplexer supply a plurality of second channels, within the plurality of channels, each of the plurality of second channels carrying a corresponding one of a plurality of data streams, each of the plurality of data streams being the repeating second bit sequence, the second bit sequence having a second width less than the width of the skew error margin, and
in the second mode, a third one of the plurality of outputs of the demultiplexer supplies a third channel, within the plurality of channels, the third channel including successive bit segments, each of which being a copy of a portion of a corresponding one of the plurality of data streams, such that one of the bit segments includes a portion of the first bit sequence, each said copy of the portion of the corresponding one of the plurality of data streams having a third width, which is greater than the skew error margin; and
an alarm generator configured to generate an alarm when a skew measured relative to the first channel and the third channel is greater than the skew error margin, the alarm including an identifier that identifies the first channel.

15. The channel skew analysis device of claim 14 wherein the channel skew analysis device is integrated within an electrical component.

16. The channel skew analysis device of claim 15 wherein the electrical component is selected from a group consisting of a framer, an error correction device, and an encoder.

17. The channel skew analysis device of claim 14 wherein the third channel is generated in accordance with an SFI-5 specification.

* * * * *